(12) United States Patent
Liu

(10) Patent No.: US 9,628,693 B2
(45) Date of Patent: Apr. 18, 2017

(54) AUTOMATIC FOCUS WITH A CONTROLLABLE PHASE DETECTION MASK

(71) Applicant: Hsin-I Cindy Liu, Santa Clara, CA (US)

(72) Inventor: Hsin-I Cindy Liu, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 120 days.

(21) Appl. No.: 14/580,857

(22) Filed: Dec. 23, 2014

(65) Prior Publication Data

US 2016/0182806 A1  Jun. 23, 2016

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01)

(58) Field of Classification Search
CPC .................................................. H04N 5/23212
USPC .......................................................... 348/349
See application file for complete search history.

(56) References Cited

U.S. PATENT DOCUMENTS

2009/0147123 A1\* 6/2009 Fujii ..................... G02B 7/285
348/333.12

\* cited by examiner

*Primary Examiner* — Usman Khan
(74) *Attorney, Agent, or Firm* — Lynch Law Patent Group, P.C.

(57) ABSTRACT

A systems, article, and method to provide automatic focus with a controllable phase detection mask.

22 Claims, 10 Drawing Sheets

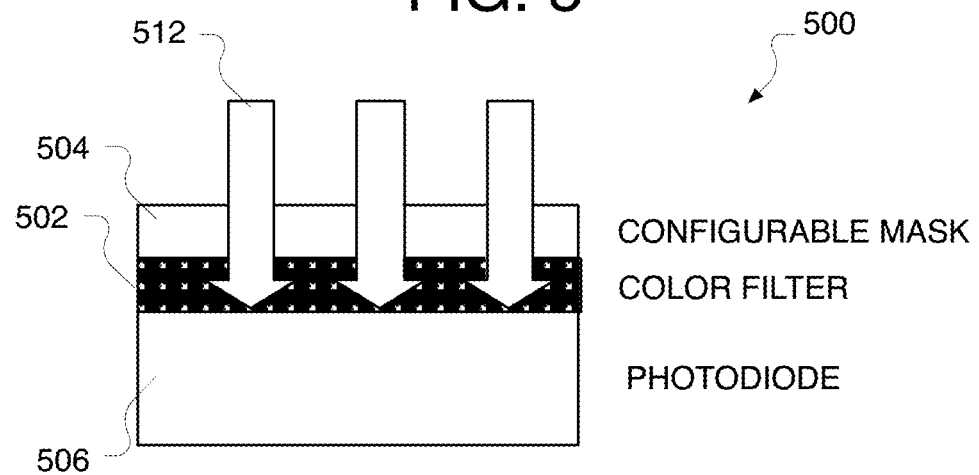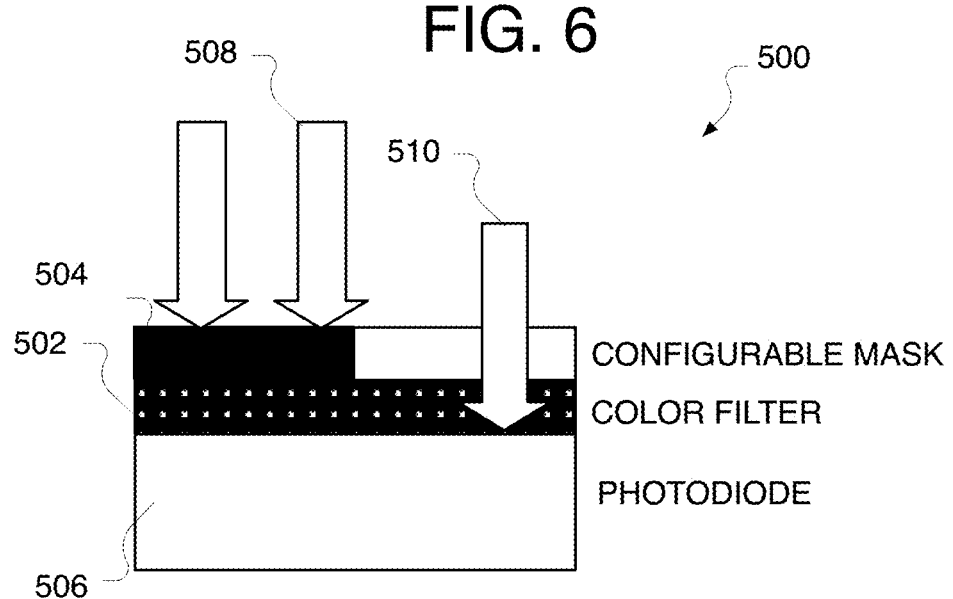

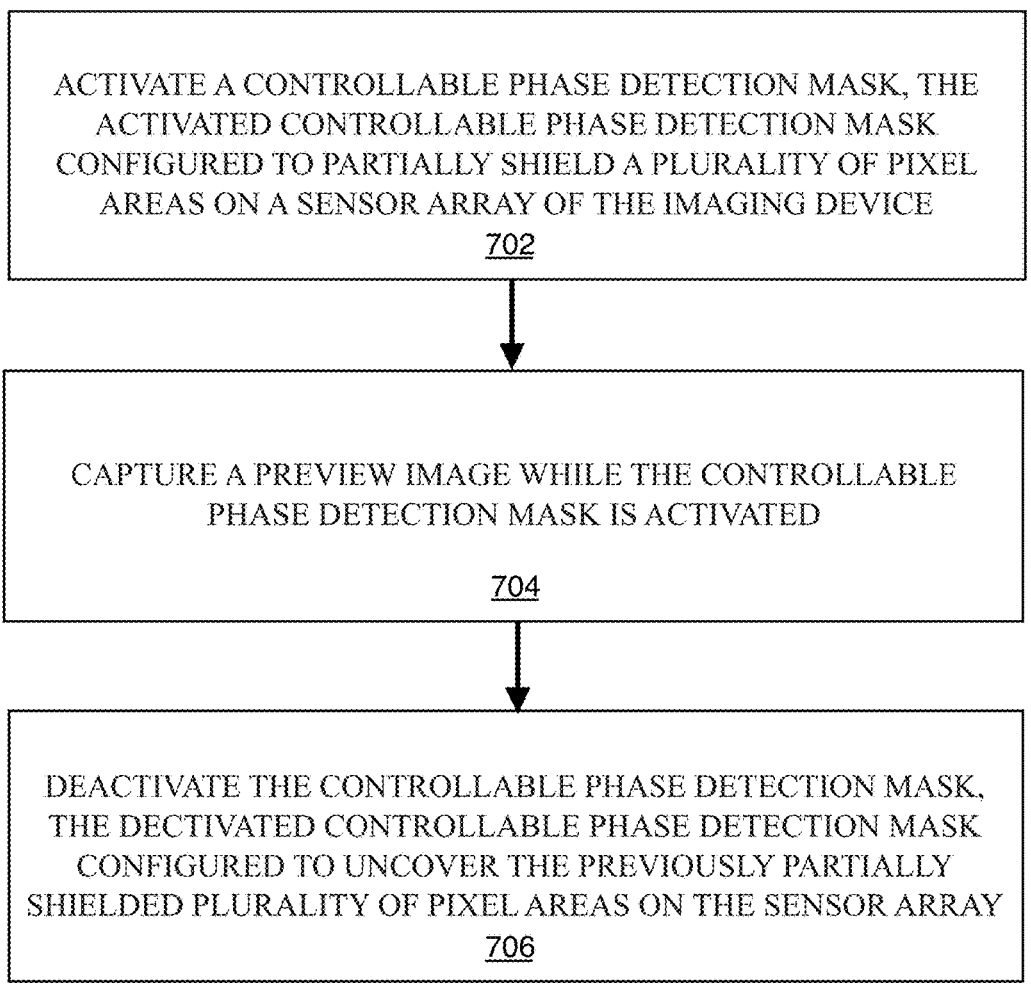

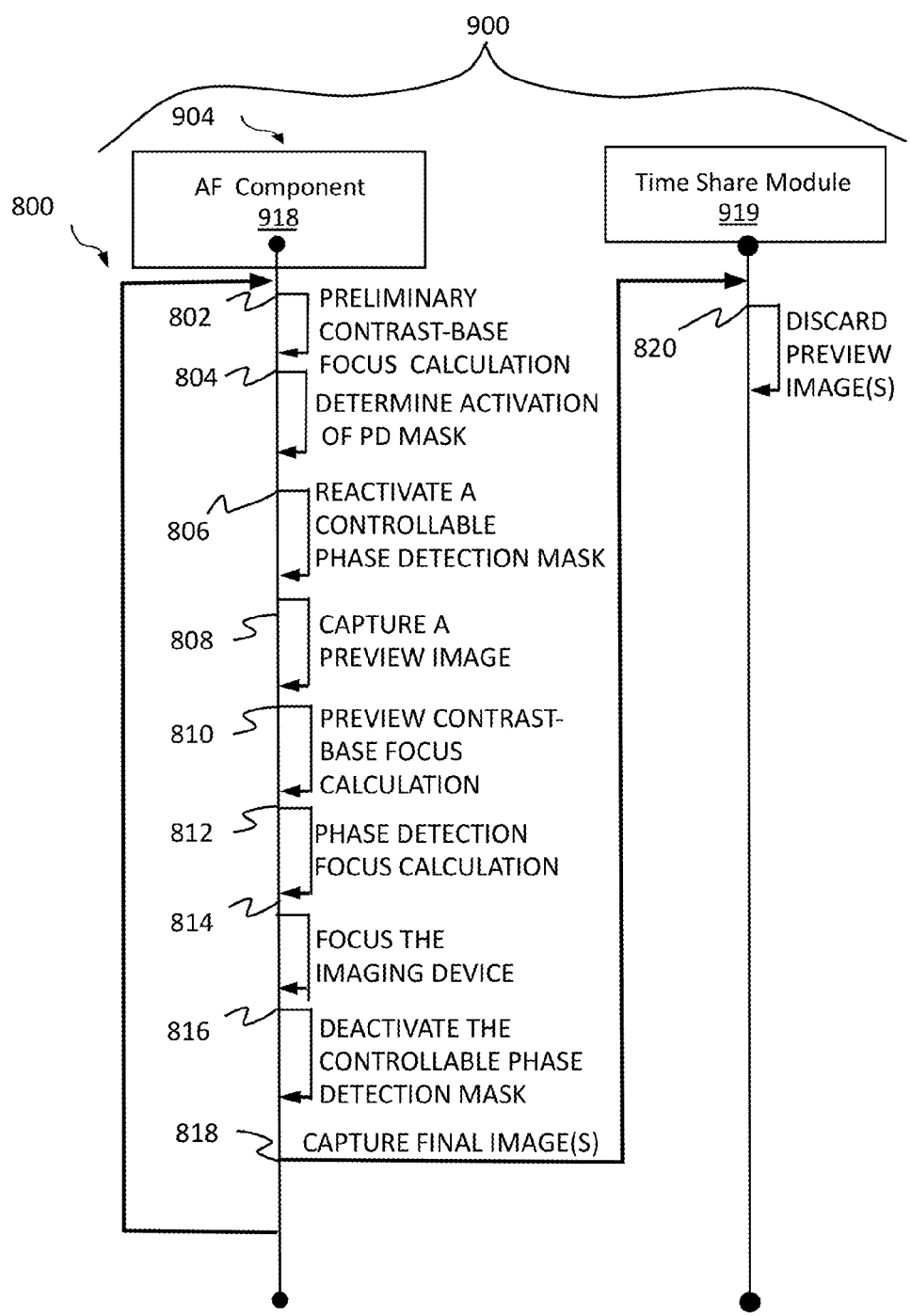

AUTOMATIC FOCUS WITH A CONTROLLABLE PHASE DETECTION MASK

BACKGROUND

Digital image processing devices, such as digital cameras, use automatic features to increase the quality of an image, such as the preview screen on the digital camera as well as the recorded image and recorded video. This includes the 3A features which refers to automatic white balancing (AWB), automatic focus (AF), and automatic exposure control (AEC). Automatic focus is the automatic adjustment of the lens position relative to an image sensor or other image capture medium to obtain a sharp, clear image.

In a camera system, to get an image without the optical blur, the lens has to be placed in the correct location so the image is focused. Traditionally, for the camera systems of the mobile electronics, such as smartphone and tablet, such a focus location can be predetermined by the typical user cases of the camera, which result in a fixed focus design Another option uses images taken at different lens distance, and such a location is determined by a "contrast-based" method, which examines the sharpness of the image. In such an example, the best focus position is determined when the sharpest image is obtained. However, this implies taking multiple images from various lens positions, while having the risk of taking extra steps as the lens traverse from front out-of-focus to back out-of-focus, as shown in FIG. 2.

In recent years, a fixed phase detection technique, which uses a particular imaging sensor architecture has been introduced to help speeding up the focusing process. This imaging sensor architecture utilizes a non-removable phase detection mask to pixels mask out half of the light from the imaging sensors. If phase detection pixels from the non-removable phase detection mask are placed with a high density, both defocus direction and displacement can be detected.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is an illustrative schematic diagram of an example pixel architecture with a controllable phase detection (PD) mask in an "off" position;

FIG. 6 is an illustrative schematic diagram of an example pixel architecture with a controllable phase detection (PD) mask in an "on" position;

FIG. 7 is an illustrative flow chart of an example autofocus process;

FIG. 8 is an illustrative diagram of an example system in operation for providing autofocus;

DETAILED DESCRIPTION

Figure 1:
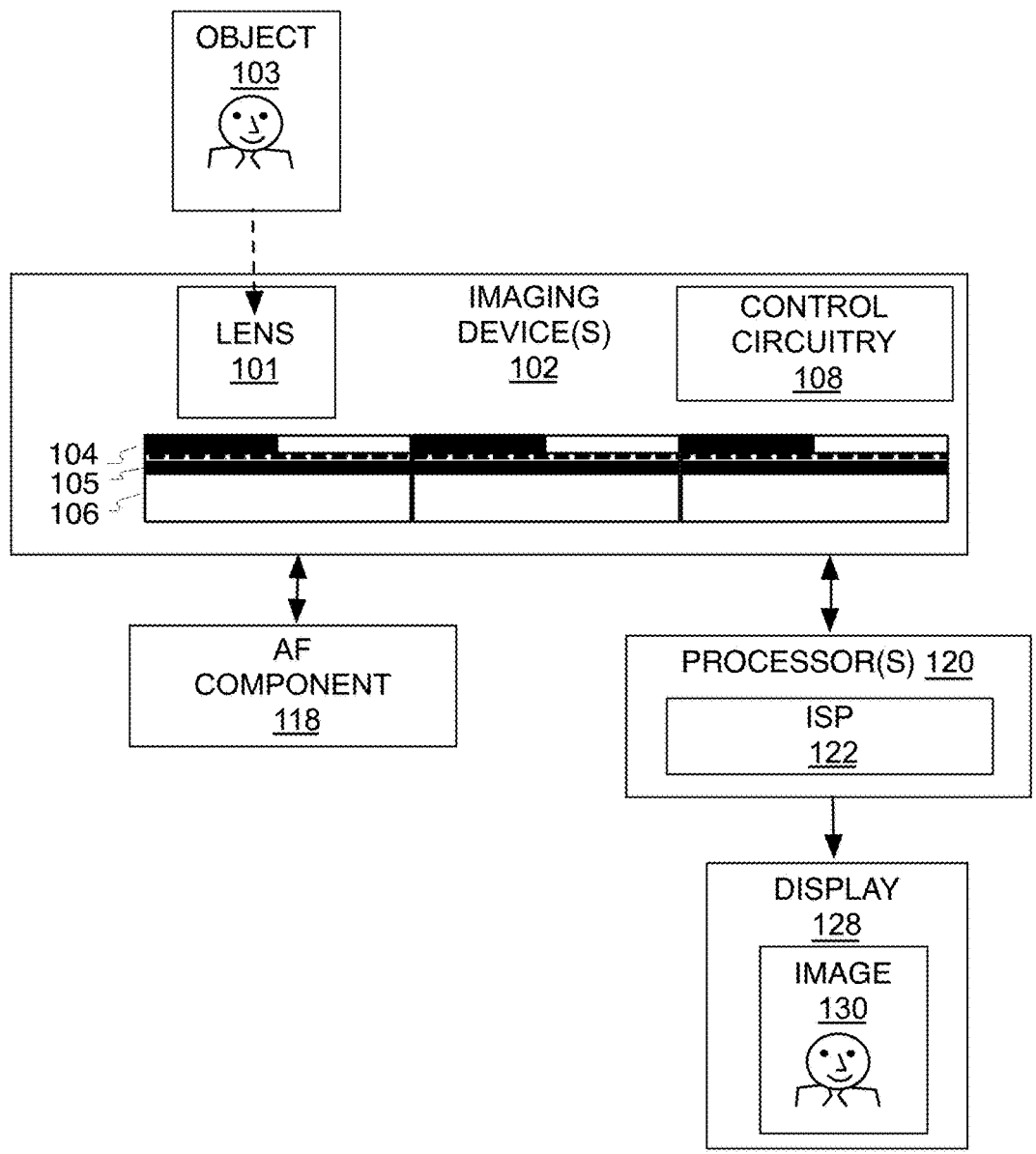
FIG. 1 is an illustrative schematic diagram of an example image capture system.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide automatic focus with a controllable phase detection mask.

As mentioned above, if phase detection pixels from the non-removable phase detection mask are placed with a high density, both defocus direction and displacement can be detected. However, such "fixed" phase detection techniques suffer from reduced image quality. This reduced image quality is due to interference from the non-removable phase detection mask. For instance, since the non-removable phase detection mask masks out half of the light, in the imaging system, their content cannot be used in the image rendering process, and the pixel value has to be corrected in the image processing pipeline. This would create challenge in image processing, and as the density of the phase detection pixels becomes higher to improve focusing, the image quality is further degraded.

According, techniques discussed below present controllable imaging sensor architecture capable of providing focusing information for fast focusing while preserving the image quality of the sensor output. This controllable imaging sensor architecture includes a configurable phase detection mask that can be enabled and disabled for focusing information collection, thus reduce the impact of image quality for the image rendered by the image processing unit.

FIG. 1 is an illustrative schematic diagram of an example image capture system 100, arranged in accordance with at least some implementations of the present disclosure. In the illustrated example, an image capture (or imaging) system 100 is provided such as a camera including a mobile camera such as a dedicated digital camera, camera mounted on a smart phone, or many other types of cameras. In various implementations, the example image capturing system 100 may have an imaging device 102 to form or receive captured image data. This can be implemented in various ways. Thus, in one form, the image capturing system 100 may be a digital camera or other image capture device, and imaging device 102, in this case, may be the camera hardware and camera sensor software, module, or component.

Such technology may include a camera such as a digital camera system, a dedicated camera device, or an imaging phone, whether a still picture or video camera or some combination of both. Thus, in one form, imaging device 102 may include camera hardware and optics including one or more sensors as well as focus control component, zoom, aperture control component, exposure control component, flash, actuator controls, the like, and/or combinations thereof. The imaging device 102 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

The imaging device 102 can be considered an optical system, which has a lens 101, a phase detection mask 104, a color filter 105 and an imaging plane formed by a sensor component 106 (e.g., photodiode array).

The lens 101 may be mounted on a lens actuator near the sensor component 106. The lens 101 captures the light from an object of interest 103 and brings it to focus on the sensor array 106. To capture an object positioned closer to the lens 101, the lens 101 is moved farther away from the sensor array 106. When the object 103 is closer to the camera than infinity, the lens 101 is moved farther away from the sensor array 106 than the infinity lens position and toward the front of the imaging device, toward the object 103.

In this disclosure, a new phase detection pixel architecture is presented to reduce the image quality degradation introduced by phase detection pixel design. On top of the color filter 105 and sensor array 106, a configurable mask 104 is placed. Such a mask 104 could be implemented by electronic controllable mechanism, such as liquid crystal on silicon (LCoS), so the opacity of the mask 104 can be controlled. When focus information, e.g., defocus direction and displacement, is needed, an electronic signal can be sent from the AF component 118 to the mask 104 via control circuitry 108.

An image signal processor (ISP) 122 portion of processor(s) 120 may render the images 130 to display 128.

The imaging device 102 also may have a lens actuator (not shown) that has a lens and a lens driver or driver logic that receives commands to move the lens and applies an electrical current to move the lens.

As mentioned above, the imaging device 102 also may have control circuitry 108 that may be configured to receive pixel data from rows and columns of individual sensors in a sensor array. Additionally, the same or similar control circuitry 108 may be used in conjunction with the autofocus (AF) component control 118 to permit the toggling on and off of configurable phase detection mask.

As mentioned above, an autofocus (AF) component control 118 may be provided on the image capturing system 100 as well to collect data from sensors and the lens actuator, to transmit the data to memories, and to run any autofocus algorithms as will be described in greater detail below.

As will be discussed in greater detail below, video coding system 100 may be used to perform some or all of the various functions discussed below in connection with FIGS. 7 and/or 8.

Figure 2:
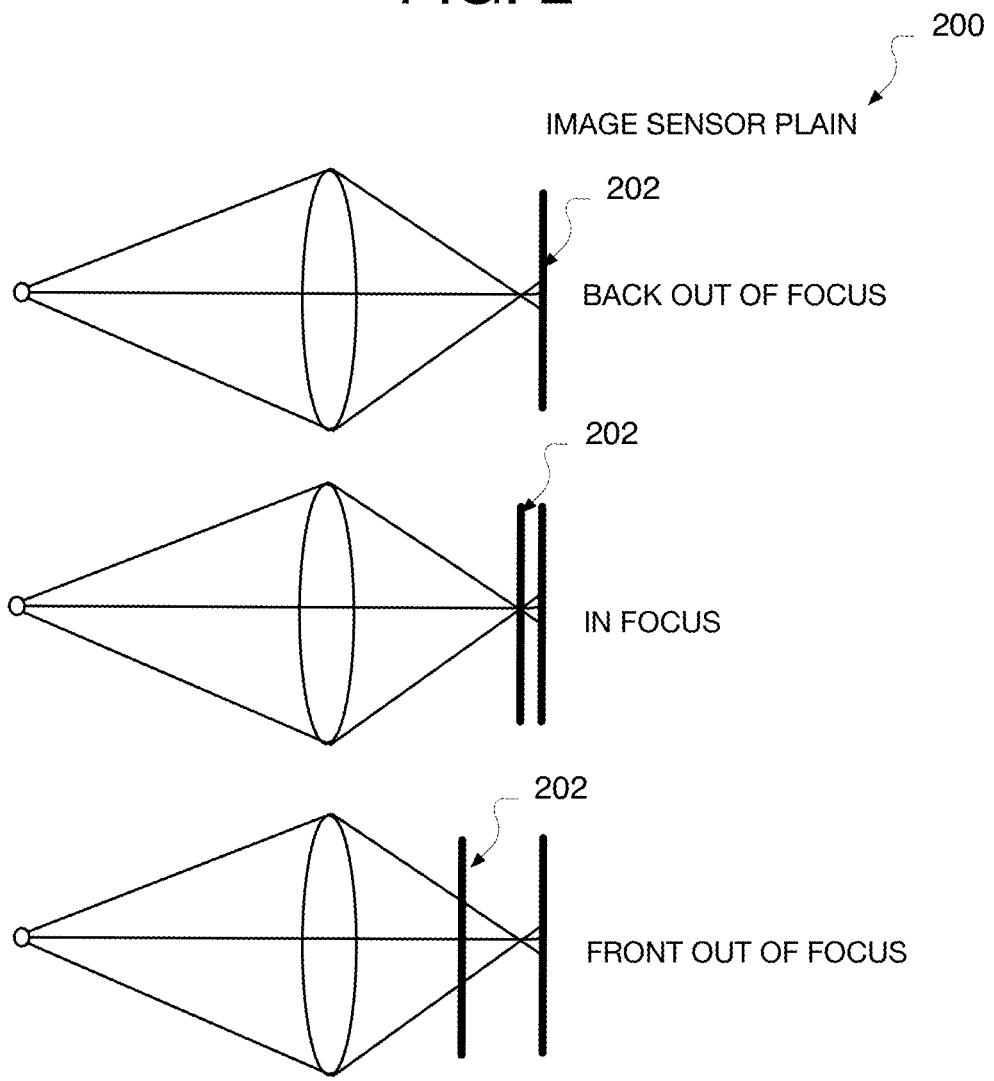
FIG. 2 is an illustrative chart showing the relationship between lens displacement and focus.

FIG. 2 is an illustrative chart showing the relationship between lens displacement and focus, arranged in accordance with at least some implementations of the present disclosure. In the illustrated example, in a camera system 200, to get an image without the optical blur, the lens 202 has to be placed in the correct location so the image is focused. Traditionally, for the camera systems 200 of the mobile electronics, such as smartphone and tablet, such a location is determined by a "contrast-base focus," which examines the sharpness of the image.

Such a "contrast-base focus" may use images taken at different lens distances. In such an example, the best focus position is determined when the sharpest image is obtained. However, this implies taking multiple images from various lens positions, while having the risk of taking extra steps as the lens traverse from front out-of-focus to back out-of-focus, as shown in FIG. 2.

As will be discussed in greater detail below, a fixed phase detection technique, which uses a particular imaging sensor architecture has been introduced to help speeding up the process.

Figure 3:
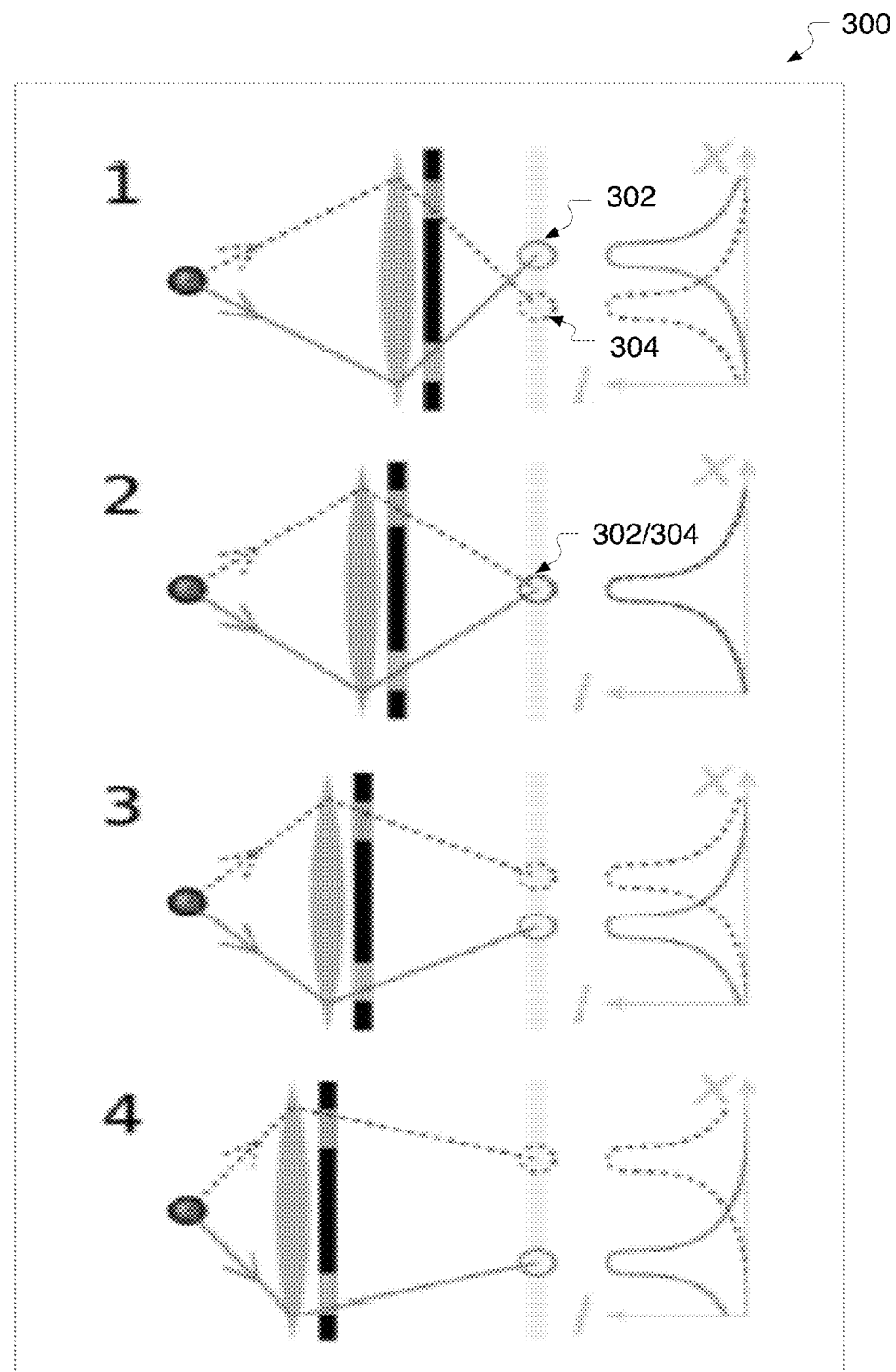
FIG. 3 is an illustrative chart showing phase detection schematics.

FIG. 3 is an illustrative chart showing phase detection schematics, arranged in accordance with at least some implementations of the present disclosure. In the illustrated example, phase detection techniques may be used to detect the focus of the imaging system. FIG. 3 shows phase detection in operation. Two image sensor pixels 302 and 304, representing red and green, receive the light from upper part of the lens and lower part of the lens, respectively. If the lens is focused, as shown in scenario 2, the two sensors 302 and 304 would receive the same response; otherwise, there will be a spatial shift between the responses of the two sensors 302 and 304, such as in scenarios 1, 3, and 4. By examining the direction and the displacement of the response, the degree and direction of defocus can be detected.

Figure 4:
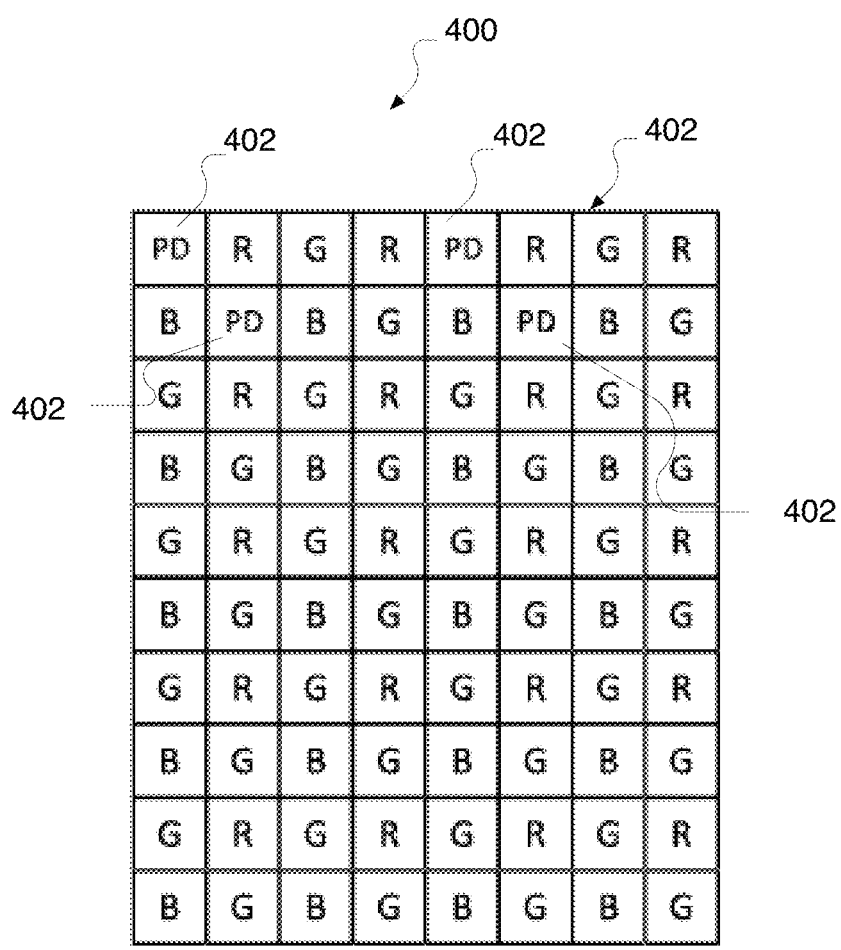
FIG. 4 is an illustrative schematic flow chart showing an example color filter array (CFA) pattern for use in phase detection.

FIG. 4 is an illustrative schematic flow chart showing an example color filter array (CFA) pattern for use in phase detection, arranged in accordance with at least some implementations of the present disclosure. In the illustrated example, In practice, the sensor array 400 to detect such displacement is implemented as an example shown in FIG. 4, where the phase detection pixel 402 is masked out half of its area in order to receive the incoming light from only half of the lens. These pixels, called phase detection (PD) pixels, are placed on top of the color filter array 404 at the same color, to avoid any discrepancy caused by illumination spectrum distribution. If PD pixels 402 are placed with a high density, both defocus direction and displacement can be detected; otherwise, only the defocus direction (phase) can be determined. In either case, the defocus information can be used in the focuser to speed up the focusing process. If both direction and displacement of defocus is known, focusing can be done is a few steps; if only the phase can be retrieved, at least half of the search procedure can be saved.

However, since the PD pixels mask out half of the light, in the imaging system, their content cannot be used in the image rendering process, and the pixel value has to be corrected in the image processing pipeline. This would create challenge in image processing, and as the density of the PD pixels becomes higher, the image quality is further degraded.

FIG. 5 is an illustrative schematic diagram of an example pixel architecture with a controllable phase detection (PD) mask in an "off" position, arranged in accordance with at least some implementations of the present disclosure. Similarly, FIG. 6 is an illustrative schematic diagram of an example pixel architecture with a controllable phase detection (PD) mask in an "on" position, arranged in accordance with at least some implementations of the present disclosure. In the illustrated examples of FIGS. 5 and 6, in this disclosure, a new phase detection pixel architecture 500 is presented to reduce the image quality degradation introduced by phase detection pixel design.

On top of the color filter 502, a configurable mask 504 is placed. Such mask could be implemented by electronic controllable mechanism, such as liquid crystal on silicon (LCoS), so the opacity of the mask can be controlled. When focus information, i.e., defocus direction and displacement, is needed, an electronic signal can be sent to the image sensor to enable the mask, as shown in FIG. 4. In such case, the pixel would have the same optical characteristic as a PD pixel, in which half of light 508 from the lens is masked and half of light 510 from the lens is let through to the photodiode 506, and the focus information can be retrieved. When the imaging system is well focused, the electronic signal is sent to the sensor to make the configurable mask transparent, so the pixel can be used as a typical color pixel, as shown in FIG. 4. In this way, when the imaging system is not in the focusing process, there is no impact on image quality.

In the camera system, one can control the focusing operation on request. If focusing is in progress and focus information is needed, the mask is "on (e.g., allowing half of light 508 to pass through to photodiode 506, as shown in FIG. 6), while the PD pixels need to be corrected in the image processing unit. When the focusing operation is done, the mask is "off" (e.g., allowing all of light 512 to pass through to photodiode 506, as shown in FIG. 5), and the image rendering can be done without extra overhead. In video preview and recording, the frequency of focusing operation can be scheduled so the impact of image quality can be reduced.

FIG. 7 is an illustrative flow chart of an example autofocus process, arranged in accordance with at least some implementations of the present disclosure. In the illustrated example, process 700 may include one or more operations, functions or actions as illustrated by one or more of operations 702, 704, and/or 706. By way of non-limiting example, process 700 will be described herein with reference to example image capture system 100 and/or image processing system 900 of FIGS. 1 and 9 respectively where relevant.

By one implementation of an image capture device, process 700 may include operation 702, "ACTIVATE A CONTROLLABLE PHASE DETECTION MASK, THE ACTIVATED CONTROLLABLE PHASE DETECTION MASK CONFIGURED TO PARTIALLY SHIELD A PLURALITY OF PIXEL AREAS ON A SENSOR ARRAY OF THE IMAGING DEVICE", where a controllable phase detection mask may be activated. For example, the activated controllable phase detection mask may be configured to partially shield a plurality of pixel areas on a sensor array of the imaging device.

Processing may continue from operation 702 to operation 704, "CAPTURE A PREVIEW IMAGE WHILE THE CONTROLLABLE PHASE DETECTION MASK IS ACTIVATED", where a preview image may be captured. For example, a preview image may be captured while the controllable phase detection mask is activated.

Processing may continue from operation 702 to operation 704, "DEACTIVATE THE CONTROLLABLE PHASE DETECTION MASK, THE DEACTIVATED CONTROLLABLE PHASE DETECTION MASK CONFIGURED TO UNCOVER THE PREVIOUSLY PARTIALLY SHIELDED PLURALITY OF PIXEL AREAS ON THE SENSOR ARRAY", where the controllable phase detection mask may be deactivated. For example, the deactivated controllable phase detection mask may be configured to uncover the previously partially shielded plurality of pixel areas on the sensor array.

In operation, a new phase detection pixel architecture with a controllable phase detection mask may generate focus information by adaptably changing the pixel response of the image sensor.

In some implementations, a control mechanism may be utilized to generate focus information upon request by selectively activating and deactivating the controllable phase detection mask. If the focus information is retrieved and the system is in focus, the mechanism can be used to modify the pixel response by deactivating the controllable phase detection mask so the image quality of a final image is not affected.

For example, such an image sensor architecture with a controllable phase detection mask may reduce the image quality degradation introduced by phase detection pixel design. Such a controllable phase detection mask could be implemented by electronic controllable mechanism, such as liquid crystal on silicon (LCoS), so the opacity of the mask can be controlled. When focus information, e.g., defocus direction and displacement, is needed, an electronic signal can be sent from the AF component to the mask 104 via control circuitry, for example.

In some implementations, there may be a time sharing mechanism that can control when to enable the focusing information retrieving. If the focusing information is retrieving, the image frame can be dropped so there is no perceivable image quality drop due to the changing of pixel response in claim 1. For example, if the image capturing device were in video capture mode, certain frames may be captured with an activated controllable phase detection mask. Such frames may be used for focusing purposed and discarded.

As will be discussed in greater detail below, additional and/or alternative details of process 700 may be found below in connection with FIG. 8.

FIG. 8 is an illustrative diagram of an example system in operation via process 800 for providing autofocus, arranged in accordance with at least some implementations of the present disclosure. In the illustrated example, process 800 may include one or more operations, functions or actions as illustrated by one or more of actions 802, 804, etc. By way of non-limiting example, process 800 will be described herein with reference to FIG. 9. Specifically, system 900 includes an one or more logic modules 904, which may include an autofocus (AF) component 918 and/or an time share module 919. The operation of the system may proceed as follows.

By one implementation of an image capture device, process 800 may include operation 802, "PRELIMINARY CONTRAST-BASE FOCUS CALCULATION", where a preliminary contrast-base focus calculation may be performed. For example, a preliminary contrast-base focus calculation may be performed based at least in part on a captured preliminary image, via the automatic focus module.

Processing may continue from operation 802 to operation 804, "DETERMINE ACTIVATION OF PD MASK", where a determination may be made as to when to activate the controllable phase detection mask. For example, a determination may be made as to when to activate the controllable phase detection mask based at least in part on the preliminary contrast-base focus calculation, via the automatic focus module.

Processing may continue from operation 804 to operation 806, "ACTIVATE A CONTROLLABLE PHASE DETECTION MASK", where a controllable phase detection mask may be activated. For example, the activated controllable phase detection mask may be configured to partially shield a plurality of pixel areas on a sensor array of the imaging device.

Processing may continue from operation 806 to operation 808, "CAPTURE A PREVIEW IMAGE", where a preview image may be captured. For example, a preview image may be captured while the controllable phase detection mask is activated.

Processing may continue from operation 808 to operation 810, "PREVIEW CONTRAST-BASE FOCUS CALCULATION", where a preview contrast-base focus calculation may be performed. For example, a preview contrast-base focus calculation may be performed based at least in part on the captured preview image, via the automatic focus module.

Processing may continue from operation 810 to operation 812, "PHASE DETECTION FOCUS CALCULATION", where a phase detection focus calculation may be performed. For example, a phase detection focus calculation may be performed based at least in part on the captured preview image, via the automatic focus module.

Processing may continue from operation 812 to operation 814, "FOCUS THE IMAGING DEVICE", where the imaging device may be focused. For example, the imaging device may be focused based at least in part on the phase detection focus calculation and/or on the preview contrast-base focus calculation, via the automatic focus module.

Processing may continue from operation 814 to operation 816, "DEACTIVATE THE CONTROLLABLE PHASE DETECTION MASK", where the controllable phase detection mask may be deactivated. For example, the deactivated controllable phase detection mask may be configured to uncover the previously partially shielded plurality of pixel areas on the sensor array. Please note that operation 816 may be performed at any time prior to capturing of final images and may be done earlier in the process as illustrated here.

Processing may continue from operation 816 to operation 818, "CAPTURE FINAL IMAGE(S)", where one or more final images may be captured. For example, one or more final images may be captured when the controllable phase detection mask is deactivated.

Processing may continue from operation 818 to operation 820, "DISCARD PREVIEW IMAGE(S)", where the preview image from a series of captured final images may be discarded. For example, in cases where the preview image was captured with the activated controllable phase detection mask, via a time share module.

In operation, the deactivated controllable phase detection mask may have a light transmittance of about eighty percent to about ninety percent, or above. Additionally, the activated controllable phase detection mask may have a phase detection pixel size of about one micron or less. Further, the controllable phase detection mask may be implemented in a liquid crystal on silicon layer.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 4, 6, and 7 in response to instructions conveyed to the processor by a computer readable medium.

Figure 9:
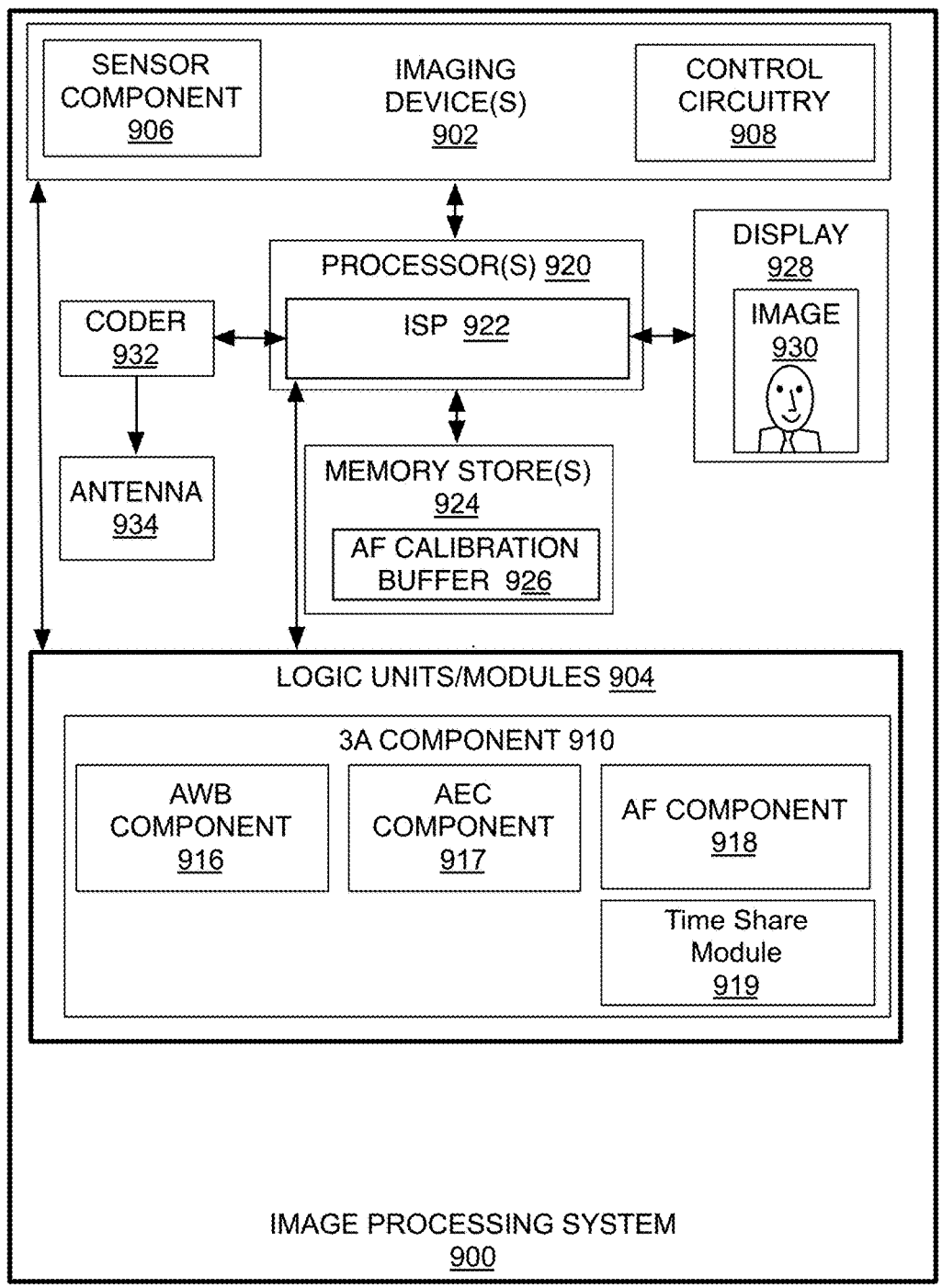
FIG. 9 is an illustrative diagram of an example system.

Referring to FIG. 9, an example image processing system 900 is arranged in accordance with at least some implementations of the present disclosure. In various implementations, the example image processing system 900 may have an imaging device 902 to form or receive captured image data. This can be implemented in various ways. Thus, in one form, the image processing system 900 may be a digital camera or other image capture device, and imaging device 902, in this case, may be the camera hardware and camera sensor software, module, or component. In other examples, imaging processing system 900 may have an imaging device 902 that includes or may be a camera, and logic modules 904 may communicate remotely with, or otherwise may be communicatively coupled to, the imaging device 902 where the changes controlled by logic units 904 may affect the data acquired by 902.

In either case, such technology may include a camera such as a digital camera system, a dedicated camera device, or a smartphone with camera feature, whether a still picture or video camera or some combination of both. Thus, in one form, imaging device 902 may include camera hardware and optics including one or more sensors as well as focus control component, zoom, aperture control component, exposure control component, flash, actuator controls, the like, and/or combinations thereof. The imaging device 902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 902 may be provided with an eye tracking camera.

The imaging device 902 also may have a lens actuator (not shown) that has a lens and a lens driver or driver logic that receives commands to move the lens and applies an electrical current to move the lens. An autofocus (AF) control 910 may be provided on the imaging device as well to collect data from sensors and the lens actuator, and to transmit the data to memories and/or the AF component 912.

The imaging device 902 also may have control circuitry that may be configured to receive pixel data from rows and columns of individual sensors in a sensor array. Additionally, the same or similar control circuitry may control the toggling on and off of configurable phase detection mask.

In the illustrated example, the logic modules 904 may include the AF component 918 that, in turn, includes an AF algorithm that is the same or similar to the algorithms discussed above with regard to FIGS. 7 and/or 7. The logic modules 904 also may include an automatic white balance (AWB) module 916, and an automatic exposure control (AEC) module 917. The 3A components 910 including the AF component 918 may be operated by, or even entirely or partially located at, processor(s) 920, and which may include an image signal processor (ISP) 922. The logic modules 904 may be communicatively coupled to the components of the imaging device 902 in order to receive raw image data described herein.

The image processing system 900 may have one or more processors 920 which may include a dedicated image signal processor (ISP) 922, memory stores 924 which may or may not hold the AF calibration buffers 926, one or more displays 928 to provide images 930, coder 932, and antenna 934. In one example implementation, the image processing system 100 may have the display 928, at least one processor 920 communicatively coupled to the display, at least one memory 924 communicatively coupled to the processor and having a circular buffer 926 by one example for storing the self-calibration as explained above. The coder 932 and antenna 934 may be provided to compress image data for transmission from ISP 922 to other devices that may display or store the image. It will be understood that the image processing system 900 may also include a decoder (or coder 932 may include a decoder) to receive and decode image data for processing by the system 900. Otherwise, the processed image 930 may be displayed on display 928 or stored in memory 924.

As illustrated, any of these components may be capable of communication with one another and/or communication with portions of logic modules 904 and/or imaging device 902. Thus, processors 920 may be communicatively coupled to both the image device 902 and the logic modules 904 for operating those components. By one approach, although image processing system 900, as shown in FIG. 9, may include one particular set of blocks or actions associated with particular components or modules, these blocks or actions may be associated with different components or modules than the particular component or module illustrated here.

Figure 10:
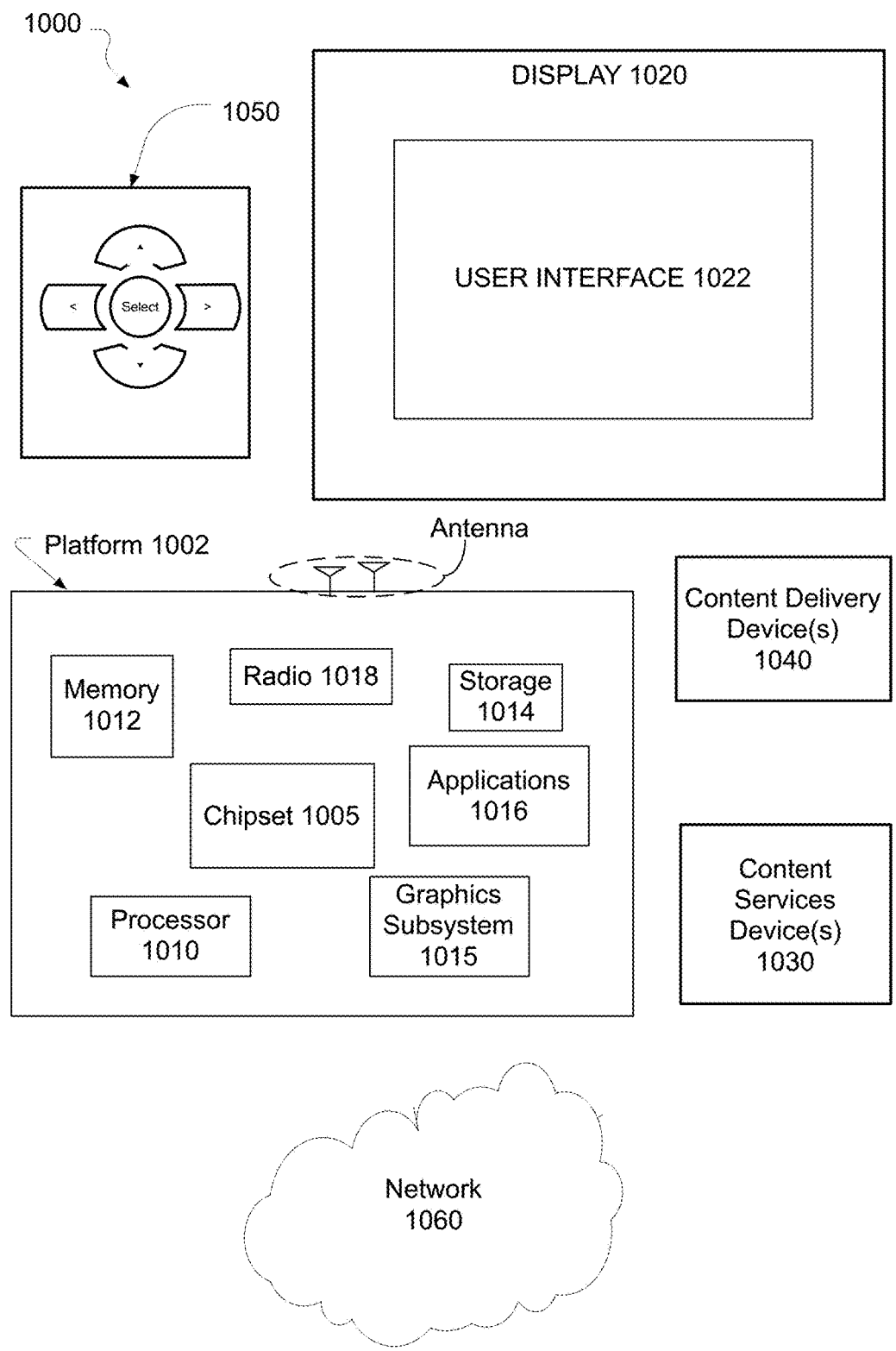
FIG. 10 is an illustrative diagram of another example system.

Referring to FIG. 10, an example system 1000 in accordance with the present disclosure operates one or more aspects of the image processing system described herein. It will be understood from the nature of the system components described below that such components may be associated with, or used to operate, certain part or parts of the image processing system described above. In various implementations, system 1000 may be a media system although system 1000 is not limited to this context. For example, system 1000 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
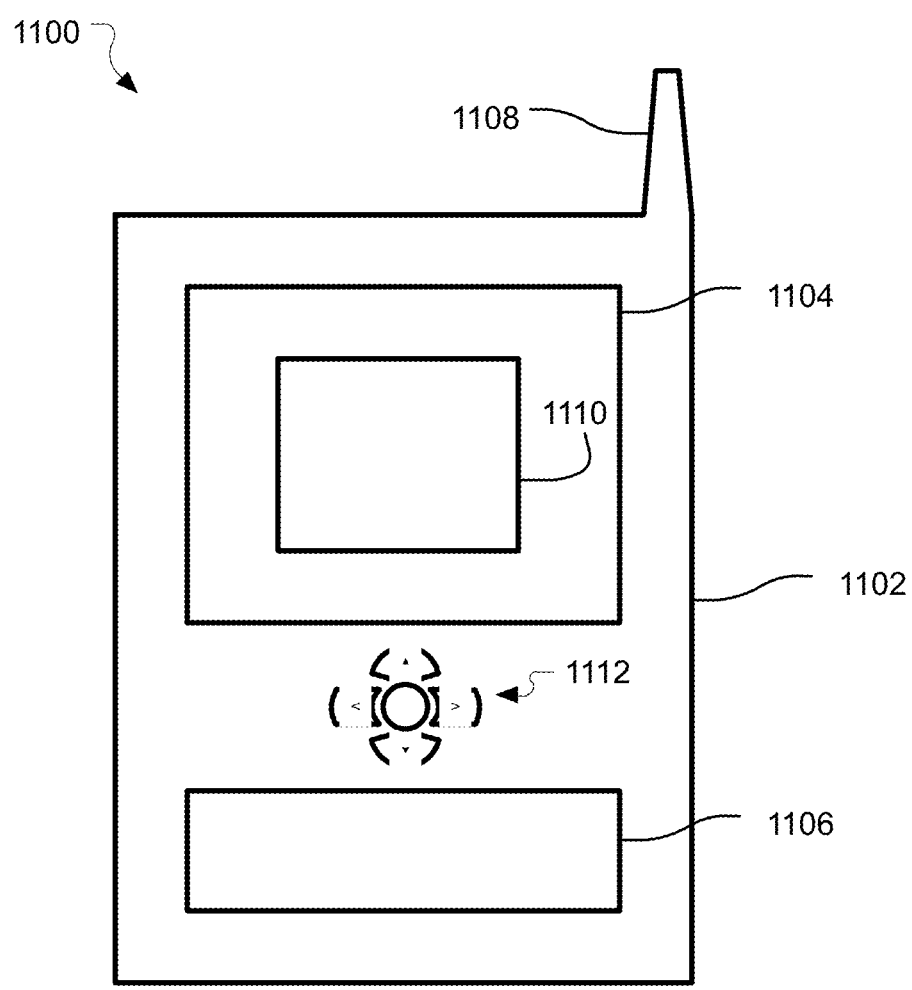
FIG. 11 illustrates another example device, all arranged in accordance with at least some implementations of the present disclosure.

Referring to FIG. 11, a small form factor device 1100 is one example of the varying physical styles or form factors in which system 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1000 may include a housing 1102, a display 1104 including a screen 1110, an input/output (I/O) device 1106, and an antenna 1108. Device 1100 also may include navigation features 1012. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for of automatic focus for an imaging device may include activating, via an automatic focus module, a controllable phase detection mask, where the activated controllable phase detection mask may be configured to partially shield a plurality of pixel areas on a sensor array of the imaging device. A preview image may be captured while the controllable phase detection mask is activated. The automatic focus module may deactivate the controllable phase detection mask, where the deactivated controllable phase detection mask may be configured to uncover the previously partially shielded plurality of pixel areas on the sensor array.

In another example, a computer-implemented method of automatic focus for an imaging device may further include performing, via the automatic focus module, a preliminary contrast-base focus calculation based at least in part on a captured preliminary image. The automatic focus module may further: determine when to activate the controllable phase detection mask based at least in part on the preliminary contrast-base focus calculation; perform a preview contrast-base focus calculation based at least in part on the captured preview image; perform a phase detection focus calculation based at least in part on the captured preview image; and/or focus the imaging device based at least in part on the phase detection focus calculation and/or on the preview contrast-base focus calculation. One or more final images may be captured when the controllable phase detection mask is deactivated. A time share module may discard the preview image from a series of captured final images in cases where the preview image was captured with the activated controllable phase detection mask. The deactivated controllable phase detection mask may have a light transmittance of about eighty percent to about ninety percent. The activated controllable phase detection mask may have a phase detection pixel size of about one micron or less. The controllable phase detection mask may be implemented in a liquid crystal on silicon layer.

In other examples, a computer-implemented imaging device system of autofocus may include a display, at least one processor communicatively coupled to the display, at least one memory communicatively coupled to at least one processor, a sensor array communicatively coupled to at least one processor; a controllable phase detection mask communicatively coupled to at least one processor; and/or an automatic focus (AF) module communicatively coupled to the processor. The at least one memory may be configured to store autofocus data used to capture images. The sensor array may be configured to capture images. The controllable phase detection mask may be configured to partially shield a plurality of pixel areas on the sensor array when activated and configured to uncover the previously partially shielded plurality of pixel areas on the sensor array when deactivated. The automatic focus (AF) module may be configured to activate the controllable phase detection mask prior to capturing a preview image and deactivate the controllable phase detection mask after the capturing of the preview image.

In another example, the imaging device system may further include the automatic focus module being further configured to: perform a preliminary contrast-base focus calculation based at least in part on a captured preliminary image; determine when to activate the controllable phase detection mask based at least in part on the preliminary contrast-base focus calculation; perform a preview contrast-base focus calculation based at least in part on the captured preview image; perform a phase detection focus calculation based at least in part on the captured preview image; and/or focus the imaging device based at least in part on the phase detection focus calculation and/or on the preview contrast-base focus calculation. The imaging device system is further configured to capture one or more final images when the controllable phase detection mask is deactivated. The imaging device system may further include a time share module configured to discard the preview image from a series of captured final images in cases where the preview image was captured with the activated controllable phase detection mask. The deactivated controllable phase detection mask may have a light transmittance of about eighty percent to about ninety percent. The activated controllable phase detection mask may have a phase detection pixel size of about one micron or less. The controllable phase detection mask may be implemented in a liquid crystal on silicon layer.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic focus for an imaging device, comprising:
   activating, via an automatic focus module, a controllable phase detection mask, wherein the activated controllable phase detection mask is configured to partially shield a plurality of pixel areas on a sensor array of the imaging device;
   capturing a preview image while the controllable phase detection mask is activated; and
   deactivating, via the automatic focus module, the controllable phase detection mask, wherein the deactivated controllable phase detection mask is configured to uncover the previously partially shielded plurality of pixel areas on the sensor array.

2. The method of claim 1, further comprising:
   performing, via the automatic focus module, a preliminary contrast-base focus calculation based at least in part on a captured preliminary image; and
   determining, via the automatic focus module, when to activate the controllable phase detection mask based at least in part on the preliminary contrast-base focus calculation.

3. The method of claim 1, further comprising:
   performing, via the automatic focus module, a phase detection focus calculation based at least in part on the captured preview image; and
   focusing, via the automatic focus module, the imaging device based at least in part on the phase detection focus calculation.

4. The method of claim 1, further comprising:
   performing, via the automatic focus module, a preview contrast-base focus calculation based at least in part on the captured preview image;
   performing, via the automatic focus module, a phase detection focus calculation based at least in part on the captured preview image; and
   focusing, via the automatic focus module, the imaging device based at least in part on the phase detection focus calculation and/or on the preview contrast-base focus calculation.

5. The method of claim 1, further comprising:
   capturing one or more final images when the controllable phase detection mask is deactivated.

6. The method of claim 1, further comprising:
   capturing one or more final images when the controllable phase detection mask is deactivated; and
   discarding, via a time share module, the preview image from a series of captured final images in cases where the preview image was captured with the activated controllable phase detection mask.

7. The method of claim 1, wherein the deactivated controllable phase detection mask has a light transmittance of about eighty percent to about ninety percent.

8. The method of claim 1, wherein the activated controllable phase detection mask has a phase detection pixel size of about one micron or less.

9. The method of claim 1, wherein the controllable phase detection mask is implemented in a liquid crystal on silicon layer.

10. The method of claim 1, further comprising:
    performing, via the automatic focus module, a preliminary contrast-base focus calculation based at least in part on a captured preliminary image;
    determining, via the automatic focus module, when to activate the controllable phase detection mask based at least in part on the preliminary contrast-base focus calculation;
    performing, via the automatic focus module, a preview contrast-base focus calculation based at least in part on the captured preview image;
    performing, via the automatic focus module, a phase detection focus calculation based at least in part on the captured preview image;
    focusing, via the automatic focus module, the imaging device based at least in part on the phase detection focus calculation and/or on the preview contrast-base focus calculation;
    capturing one or more final images when the controllable phase detection mask is deactivated; and
    discarding, via a time share module, the preview image from a series of captured final images in cases where the preview image was captured with the activated controllable phase detection mask,
    wherein the deactivated controllable phase detection mask has a light transmittance of about eighty percent to about ninety percent, wherein the activated controllable phase detection mask has a phase detection pixel size of about one micron or less, and wherein the controllable phase detection mask is implemented in a liquid crystal on silicon layer.

11. A computer-implemented imaging device system for autofocus, comprising:
    a display;
    at least one processor communicatively coupled to the display;
    at least one memory communicatively coupled to at least one processor and configured to store autofocus data used to capture images;
    a sensor array communicatively coupled to at least one processor and configured to capture images;
    a controllable phase detection mask communicatively coupled to at least one processor and configured to partially shield a plurality of pixel areas on the sensor array when activated and configured to uncover the previously partially shielded plurality of pixel areas on the sensor array when deactivated; and
    an automatic focus (AF) module communicatively coupled to the processor, and configured to activate the controllable phase detection mask prior to capturing a preview image and deactivate the controllable phase detection mask after the capturing of the preview image.

12. The system of claim 11, wherein the automatic focus module is further configured to:
perform a preliminary contrast-base focus calculation based at least in part on a captured preliminary image; and
determine when to activate the controllable phase detection mask based at least in part on the preliminary contrast-base focus calculation.

13. The system of claim 11, wherein the automatic focus module is further configured to:
perform a phase detection focus calculation based at least in part on the captured preview image; and
focus the imaging device based at least in part on the phase detection focus calculation.

14. The system of claim 11, wherein the automatic focus module is further configured to:
perform a preview contrast-base focus calculation based at least in part on the captured preview image;
perform a phase detection focus calculation based at least in part on the captured preview image; and
focus the imaging device based at least in part on the phase detection focus calculation and/or on the preview contrast-base focus calculation.

15. The system of claim 11, wherein the computer-implemented system is further configured to:
capture one or more final images when the controllable phase detection mask is deactivated.

16. The system of claim 11, wherein the computer-implemented system is further configured to:
capture one or more final images when the controllable phase detection mask is deactivated; and
discard, via a time share module, the preview image from a series of captured final images in cases where the preview image was captured with the activated controllable phase detection mask.

17. The system of claim 11, wherein the deactivated controllable phase detection mask has a light transmittance of about eighty percent to about ninety percent.

18. The system of claim 11, wherein the activated controllable phase detection mask has a phase detection pixel size of about one micron or less.

19. The system of claim 11, wherein the controllable phase detection mask is implemented in a liquid crystal on silicon layer.

20. The system of claim 11, further comprising:
wherein the automatic focus module is further configured to:
perform a preliminary contrast-base focus calculation based at least in part on a captured preliminary image;
determine when to activate the controllable phase detection mask based at least in part on the preliminary contrast-base focus calculation;
perform a preview contrast-base focus calculation based at least in part on the captured preview image;
perform a phase detection focus calculation based at least in part on the captured preview image;
focus the imaging device based at least in part on the phase detection focus calculation and/or on the preview contrast-base focus calculation;
wherein the imaging device system is further configured to: capture one or more final images when the controllable phase detection mask is deactivated; and
wherein the imaging device system may further include:
discard, a time share module, wherein the time share module is configured to discard the preview image from a series of captured final images in cases where the preview image was captured with the activated controllable phase detection mask,
wherein the deactivated controllable phase detection mask has a light transmittance of about eighty percent to about ninety percent, wherein the activated controllable phase detection mask has a phase detection pixel size of about one micron or less, and wherein the controllable phase detection mask is implemented in a liquid crystal on silicon layer.

21. At least one non-transitory machine readable medium comprising:
a plurality of instructions that in response to being executed on a computing device, causes the computing device to perform:
activating a controllable phase detection mask, wherein the activated controllable phase detection mask is configured to partially shield a plurality of pixel areas on a sensor array of the imaging device; and
deactivating the controllable phase detection mask, wherein the deactivating occurs after capturing a preview image while the controllable phase detection mask is activated, and wherein the deactivated controllable phase detection mask is configured to uncover the previously partially shielded plurality of pixel areas on the sensor array.

22. The at least one machine readable medium method of claim 21, further comprising:
perform a preliminary contrast-base focus calculation based at least in part on a captured preliminary image;
determine when to activate the controllable phase detection mask based at least in part on the preliminary contrast-base focus calculation;
perform a preview contrast-base focus calculation based at least in part on the captured preview image;
perform a phase detection focus calculation based at least in part on the captured preview image;
focus the imaging device based at least in part on the phase detection focus calculation and/or on the preview contrast-base focus calculation;
capture one or more final images when the controllable phase detection mask is deactivated; and
discard the preview image from a series of captured final images in cases where the preview image was captured with the activated controllable phase detection mask.

* * * * *